(12) United States Patent
Rajala

(10) Patent No.: US 6,295,286 B1
(45) Date of Patent: Sep. 25, 2001

(54) METHOD FOR INDICATING A MULTI-SLOT CHANNEL IN A TDMA RADIO SYSTEM

(75) Inventor: Jussi Rajala, Espoo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/836,969

(22) PCT Filed: Nov. 24, 1995

(86) PCT No.: PCT/FI95/00651

§ 371 Date: Aug. 4, 1997

§ 102(e) Date: Aug. 4, 1997

(87) PCT Pub. No.: WO96/17447

PCT Pub. Date: Jun. 6, 1996

(30) Foreign Application Priority Data

Nov. 25, 1994 (FI) ........................................ 945540

(51) Int. Cl.$^7$ ........................................... H04J 3/00
(52) U.S. Cl. ............................................... 370/337
(58) Field of Search .................................. 370/347, 337, 370/311, 442, 336, 341, 345

(56) References Cited

U.S. PATENT DOCUMENTS

| | | | |
|---|---|---|---|
| 5,239,545 | * 8/1993 | Buchholz | 370/348 |
| 5,257,257 | 10/1993 | Chen et al. | 370/18 |
| 5,515,379 | * 5/1996 | Crisler et al. | 370/347 |
| 5,577,024 | * 11/1996 | Malkamaki et al. | 370/337 |

FOREIGN PATENT DOCUMENTS

| | | |
|---|---|---|
| EP 0 399 611 | 11/1990 | (EP) . |
| EP 0605 312 A1 | 7/1994 | (EP) . |
| WO 94/08431 | 4/1994 | (WO) . |
| WO 94/10767 | 5/1994 | (WO) . |
| WO 95/12931 | 5/1995 | (WO) . |
| WO 95/31878 | 11/1995 | (WO) . |

* cited by examiner

Primary Examiner—Chau Nguyen
Assistant Examiner—D Trinh
(74) Attorney, Agent, or Firm—Perman & Green, LLP

(57) ABSTRACT

The invention relates to a method for indicating a multi-slot channel in signalling received over a radio terminal in a TDMA radio system without increasing the amount of signalling compared to normal signalling used for assigning one slot to the channel and for defining the channel in other respects. In the inventive method, an element describing the channel of a normal signalling message is transformed into a code, which identifies the channel as a multi-slot channel and sets the number of successive slots to be included in the multi-slot channel. The element indicating the normal timeslot for the channel is used to indicate the first timeslot to be included in the multi-slot channel. In the GSM system, the preferred embodiment of the method replaces the 5-bit element (CHT) of a channel description information element defining the channel type and the subchannel with a code, whose two first bits (bit values 1 and 1) identify the channel as a multi-slot channel, and three remaining bits set the number of timeslots. The first timeslot is indicated with the element (TN) indicating the timeslot number.

5 Claims, 1 Drawing Sheet

METHOD FOR INDICATING A MULTI-SLOT CHANNEL IN A TDMA RADIO SYSTEM

BACKGROUND OF THE INVENTION

1. Field of the Invention

The invention relates to indicating a multi-slot channel in a TDMA radio system, in which the radio channel normally consists of one timeslot in frames made up of several successive timeslots.

2. Description of the Prior Art

In TDMA radio systems, such as many current digital cellular mobile communication systems, the radio channel is normally assigned to one timeslot in frames transmitted at radio frequency, made up of several successive timeslots. Current TDMA mobile communication systems and their radio terminals have been devised so as to enable traffic channels and control channels of various types to be formed in them. For instance in a GSM system, channels of various types, such as a traffic channel and an associated control channel, may share the capacity of the same timeslot. Some systems already allow more than one channel to be allocated at the same time. The GSM system also allows simultaneous assignment of two "half rate" traffic channels. As new services have been developed, it has turned out that, in order to achieve higher transmission capacity on a radio channel, TDMA radio systems and their radio terminals should preferably be designed to allow multi-slot channels to be readily formed and used. The present invention is specifically concerned with accomplishing this potential improvement.

EP patent specification A2 399 611 discloses a solution relating to the improvement indicated above, describing a system for rapidly assigning several duplex speech channels to a radio terminal with a view to gain higher data speed in data message transmission from the radio terminal. The basic idea of the system described is that the terminal keeps record of the use and the quality of the duplex speech channels. and whenever necessary, any additional speech channels required are directly assigned for data message transmission on the basis of the data in this record. The radio terminal may also utilize data provided by the base station and the system control unit about the availability of the speech channels, and in this conjunction, the paging or speech forming message provided by the base station may include data about the number of duplex speech channels required and/or about the numerals of the suggested channels. However, this system basically does not allow for assignment of successive physical channels. The configuration of this specification is characterised by including special provisions for swiftly making several speech channels available for rapid data transmission. The specification mentions signalling only in passing, stating that guidance data about the number of channels required and suggestions for channels to be assigned can be signalled to the radio terminal, the general impression being that this is also extra signalling for additional data transmission, apart from normal operation. In contrast. the purpose of the present invention is specifically to provide for signalling in the assignment of a multi-slot channel without increasing or complicating the signalling compared to normal operation.

OBJECT OF THE INVENTION

The procedure of forming a channel between a radio terminal in a TDMA radio system and the base station serving it usually requires a large amount of signalling. In the GSM system, in which the preferred embodiment of the present invention is set out, this signalling involves transmitting a message or a message element describing the channel to the radio terminal. This message element, referred to as the Channel Description Information Element in GSM, defines the channel parameters, such as the channel type and the timeslot used. Thus, in the case mentioned above, two half-speed traffic channels (TCH/H) being simultaneously assigned in GSM, signalling comprises transmitting, to each channel, an information element describing the respective channel. When several timeslots are to be connected, signalling by assigning each timeslot separately as though it would be a separate channel naturally involves a great inconvenience. Thus, the purpose of the invention is to provide a method for indicating a multi-slot channel which does not increase the amount of signalling compared to the signalling required for describing a channel using one timeslot. The essence of the method of the invention is that the required number of successive timeslots in a frame are assigned to a multi-slot channel.

SUMMARY OF THE INVENTION

To achieve the above purpose of the inventive method for indicating a multi-slot channel in signalling received over a radio terminal in a TDMA structure, in which a radio channel usually consists of one timeslot in successive frames sent at radio frequency and made up of several successive timeslots, and in which. in order to allocate a radio channel, a message is signalled to the radio terminal, the message containing one element describing the said one timeslot and at least one second element describing the channel, the method is characterised in that, to assign a multi-slot channel, at least one or any element of the message describing the channel is replaced with a code. which identifies the channel as a multi-slot channel and sets the number of successive timeslots to be included in the multi-slot channel, the element indicating one timeslot in the message being used to indicate the first timeslot among the successive timeslots to be included in the multi-slot channel.

The invention is applicable for instance to a channel description information element relating to GSM channel assignment signalling, in which the element defining the channel type and the subchannel is replaced with a code, in which the first numbers identify the channel as a multi-slot channel, and the last numbers define the number of timeslots to be included. Thus, the timeslot number included in the same octet of the information element indicates the first timeslot of the multi-slot channel.

BRIEF DESCRIPTION OF THE DRAWINGS

The invention will be described in detail below with reference to one embodiment and to FIG. 1 in the accompanying drawing, which is a schematic view of a channel description information element used in GSM signalling. The message element included whenever necessary in the signalling to a radio terminal provides the parameters of the channel to be formed.

DETAILED DESCRIPTION OF THE PREFERRED EMBODIMENT(S)

Figure 1:
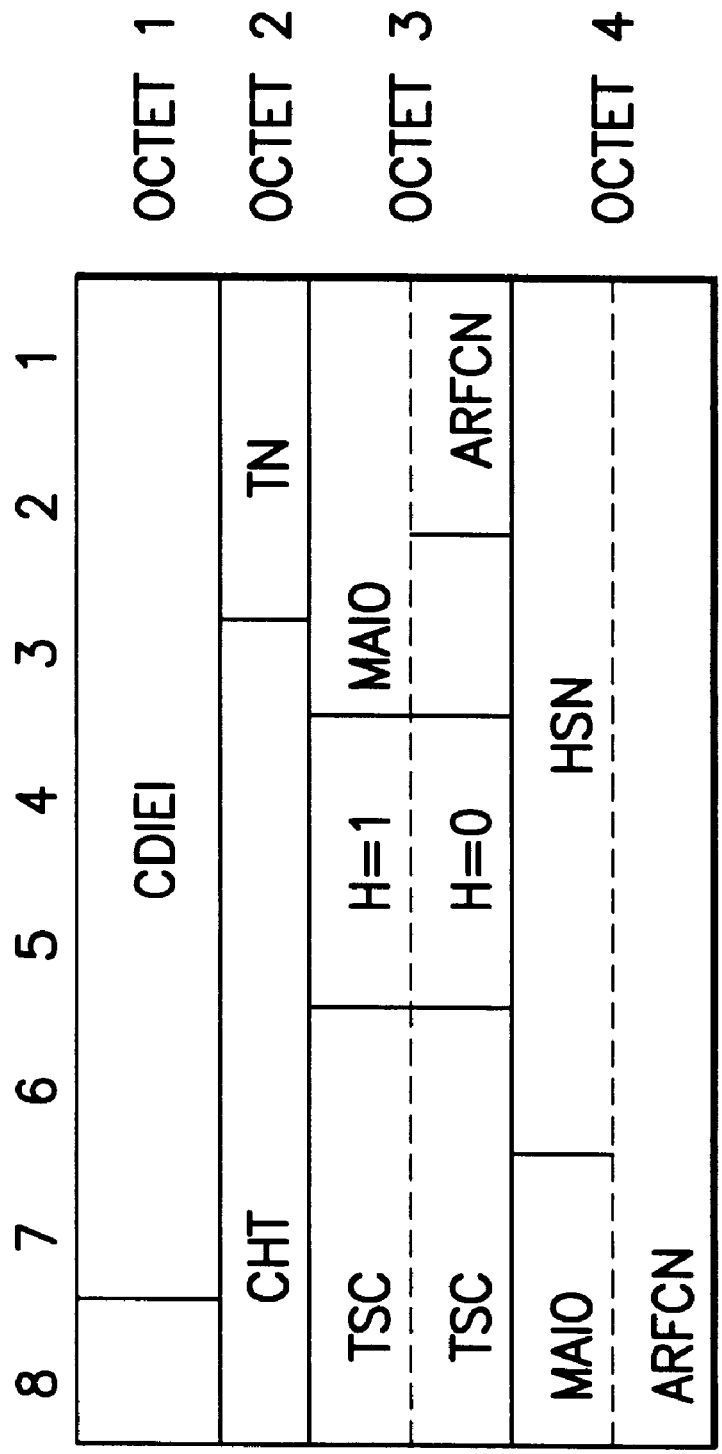

FIG. 1 illustrates four 8-bit octets included in the information element mentioned above. Bits 8 . . . 1 are indicated at the upper edge of the figure and octets 1 . . . 4 at the right edge of the figure. The element CDIEI (Channel Description Information Element Identifier) formed by bits 7 . . . 1 in octet 1 is an identifier informing the radio terminal that the message element concerned, contained in the signalling message consisting of optional message elements, is a channel description information element. In terms of the embodiment of the invention described here, a substantial part of the information element consists of a second octet. in which the element CHT (Channel Type and TDMA Offset) formed by bits 8 . . . 4 defines the channel type and the subchannel and the element TN (Timeslot Number) formed by the bits 3 . . . 1 indicates the timeslot number. As can be seen in the presentation of octets 3 and 4, the content of the information element may vary. Octet 3 starts with a Training Sequence Code TSC. and its bit 5 determines whether frequency hopping (H=1) is to be used or not (H=0). When frequency hopping is applied, the element MAIO (Mobile Allocation Index Offset), which continues into the following octet will set the point from which frequency hopping starts, and the end element HSN (Hopping Sequence Number) of octet 4 indicates the hopping sequence number. If frequency hopping is not being used, bits 4 and 3 in octet 3 will be in reserve and the element ARFCN (Absolute Radio Frequency Channel Number) covering the end of octet 3 and octet 4 will indicate the radio frequency to be used by providing its number.

The element CHT formed by bits 8 . . . 4 in octet 2 will be discussed below. A number of examples of the meanings of its code and the code used for assigning the multi-slot channel will be given below.

| Bits | |
|---|---|
| 87654 | |
| 00001 | TCH/F + ACCHs |
| 0001T | TCH/H + ACCHs |
| 001TT | SDCCH/4 + SACCH/C4 or CBCH (SDCCH/4) |
| 01TTT | SDCCH/8 + SACCH/C8 or CBCH (SDCCH/8) |
| 11nnn | Multi-slot channel |

TCH/F and TCH/H denote a full rate respectively a half rate traffic channel, ACCH denotes associated control channels in general, SDCCH stands for a stand-alone dedicated control channel, SACCH for a slow associated control channel, and CBCH for a cell broadcast channel. The bits marked T indicate the subchannel number coded in binary.

In this embodiment of the invention, the multi-slot channel is identified at the beginning of element CHT by means of bit combination 11, so far not allocated for any other use in GSM specification. The three remaining bits in element CHT, marked n above, serve to form a binary code indicating the number of timeslots included in the multi-slot channel. Three bits can be used to indicate eight different values, which is enough to define any potential multi-slot channels in a GSM system in which a frame contains eight timeslots.

The embodiment currently regarded as optimal has been described above with reference to a GSM system. Other embodiments are of course conceivable in a GSM system, in which a multi-slot channel can be assigned to a radio terminal without extra signalling as compared to normal assignment and definition of a channel using one single timeslot. Those skilled in the art will understand that other radio systems operating on the TDMA principle offer similar or other embodiments of the inventive method for assigning a multi-slot channel within the scope of the accompanying claims.

What is claimed is:

1. A method for indicating a multi-slot channel, in signalling coming to a radio terminal in a TDMA radio system, wherein the radio channel is normally formed of one timeslot in successive frames sent at radio frequency and made up of several successive timeslots, and in which, in order to assign a radio channel, a message is signalled to the radio terminal, the message containing a first element indicating one timeslot and at least one second element describing the channel, comprising the steps of:

replacing, in order to assign a multi-slot channel, at least one second element of the message describing the channel with a coder, which identifies the channel as a multi-slot channel and defines a number of timeslots to be included in the multi-slot channel, and using said first element indicating one timeslot in the message to indicate a certain timeslot among said number of timeslots to be included in the multi-slot channel.

2. A method as claimed in claim 1 for indicating a multi-slot channel, wherein said second element describing the channel is an element defining the channel type.

3. A method as claimed in claim 1 for indicating a multi-slot channel, wherein the TDMA system is a GSM system, and the message signalled to the radio terminal in order to assign a radio channel, further comprises a channel description information element signalled to the radio terminal, said channel description information element containing said first element indicating one timeslot and one of said second elements describing the channel type and the subchannel, wherein said first element is a (TN) element and said second element is a (CHT) element, and the element (CHT) is replaced with a code, which identifies the channel as a multi-slot channel and sets the number of successive timeslots to be included in the multi-slot channel, and the element (TN) indicating one timeslot is used to indicate the first timeslot among the successive timeslots to be included in the multi-slot channel.

4. A method as claimed in claim 3 for indicating a multi-slot channel, wherein said channel description information element comprises bits and among the five bits included in the element (CHT) describing the channel type and the subchannel, the two first bits are used to identify the channel as a multi-slot channel, and the three last ones are used to set the number of successive timeslots to be included in the multi-slot channel.

5. A method as claimed in claim 4 for indicating a multi-slot channel, wherein the first two bits identifying the channel as a multi-slot channel are 11.

* * * * *